(12) United States Patent
Furuyama et al.

(10) Patent No.: US 6,616,216 B2
(45) Date of Patent: Sep. 9, 2003

(54) AUTOMOTIVE DOOR CONSTRUCTION

(75) Inventors: Junichi Furuyama, Kanagawa (JP); Masayuki Saito, Kanagawa (JP); Hirotaka Nishijima, Yokohama (JP); Hiromitsu Nishikawa, Yokohama (JP)

(73) Assignees: Kasai Kogyo Co. Ltd., Kanagawa (JP); Ohi Seisakusho Co. Ltd., Yokohama (JP)

( * ) Notice: Subject to any disclaimer, the term of this patent is extended or adjusted under 35 U.S.C. 154(b) by 0 days.

(21) Appl. No.: 09/969,537

(22) Filed: Oct. 3, 2001

(65) Prior Publication Data

US 2002/0047289 A1 Apr. 25, 2002

(30) Foreign Application Priority Data

Oct. 11, 2000 (JP) .................................. 2000-310540

(51) Int. Cl.$^7$ .................................................. B60J 5/00
(52) U.S. Cl. ...................... 296/146.7; 49/349; 49/502
(58) Field of Search .......................... 49/348, 349, 352, 49/502; 296/146.5, 146.7

(56) References Cited

U.S. PATENT DOCUMENTS 5,050,347 A * 9/1991 Brusasco .................... 49/348
5,430,977 A * 7/1995 Kitayama et al. ............. 49/502
5,904,002 A * 5/1999 Emerling et al. ............. 49/502
5,924,245 A * 7/1999 Manuel et al. ............... 49/502
5,960,588 A * 10/1999 Wurm et al. ................. 49/352
6,192,632 B1 * 2/2001 Medebach et al. ............ 49/502
6,367,202 B1 * 4/2002 Reed et al.

* cited by examiner

Primary Examiner—Jerry Redman
(74) Attorney, Agent, or Firm—Foley & Lardner (57) ABSTRACT

An automotive door construction is configured so that a door trim 13 is divided into an upper trim 13$_1$ and a lower trim 13$_2$; a glass elevating mechanism 5 is installed on the inside surface of the lower trim 13$_2$ so that the upper end of a guide rail 7 projects upward from the upper edge of the lower trim 13$_2$; and the glass elevating mechanism 5 is inserted from the upper end of the guide rail 7 of the glass elevating mechanism 5 through a mount hole 2a in an inner panel 2, and is housed in a door bag portion 1b, and then the lower trim 13$_2$ is lowered along the inner panel 2, by which the glass elevating mechanism 5 and lower trim 13$_2$ are installed to the inner panel 2. By forming the relatively small mount hole 2a, which is shorter than the total length of the guide rail 7, in the inner panel 2, the modularized glass elevating mechanism 5 is incorporated in the door bag portion 1b. Therefore, the automotive door construction in which a modularized glass elevating mechanism can be incorporated without the formation of a large mount hole in the inner panel can be provided.

11 Claims, 14 Drawing Sheets

AUTOMOTIVE DOOR CONSTRUCTION

CROSS-REFERENCE TO RELATED APPLICATION

This application claims all benefits accruing under Paris Convention from the Japanese Patent Application No. 2000-310540, filed on Oct. 11, 2000.

BACKGROUND OF THE INVENTION

1. Field of the Invention

The present invention relates to an automotive door construction in which a glass elevating mechanism for raising/lowering a door glass is incorporated easily.

2. Description of Related Art

Figure 14:
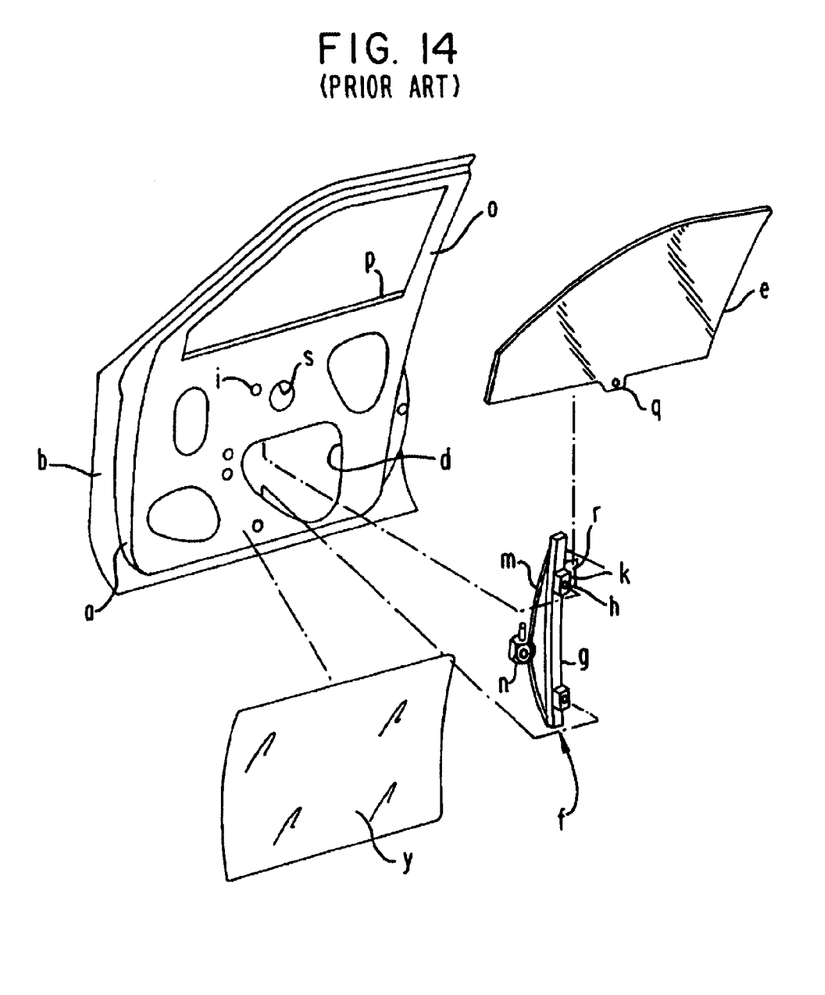
FIG. 14 is an exploded perspective view of a conventional automotive door construction.

Conventionally, a door construction of this type has a door body, having a door bag portion c between an inner panel a and an outer panel b, constructed by joining flanges formed at the outer peripheries of the inner panel a and the outer panel b to each other as shown in FIG. 14.

The inner panel a is formed with a plurality of openings d serving as installation holes for installing parts in the door bag portion c. The openings d are formed so as to be as small as possible to ensure the stiffness of the inner panel a, and in its turn the door body itself.

Through the opening d, for example, a glass elevating mechanism f to which a door glass e is not attached is slipped into the door bag portion c, and mount holes h formed in a guide rail g constituting the glass elevating mechanism f are made to coincide with mount holes i on the inner panel side. By installing screws j in the mount holes h and i, the glass elevating mechanism f is mounted on the inner panel a. The glass elevating mechanism f includes a glass mounting portion k disposed slidably in the guide rail g and a motor n for driving a wire m for sliding the glass mounting portion k. The rotation of the motor n is transmitted to the wire m, by which the glass mounting portion k is slid along the guide rail g so that the door glass e is raised or lowered. Since the guide rail g and the motor n are connected to each other by the wire m, the whole of the glass elevating mechanism f can be slipped into the door bag portion c through one of the openings d by bending the wire m.

On the other hand, after the glass elevating mechanism f is mounted on the inner panel a, the lower end side of the door glass e is inserted through an upper opening p in the door bag portion c, and a mount hole q formed in the lower end portion of the door glass e is made to coincide with a mount hole r in the glass mounting portion k provided slidably in the guide rail g. In this state, a screw is tightened by a screwdriver etc. inserted through a through hole s, by which the door glass e is mounted on the glass mounting portion k so that the door glass e can be raised and lowered in a window sash o installed so as to extend into the door bag portion c.

Figure 15:
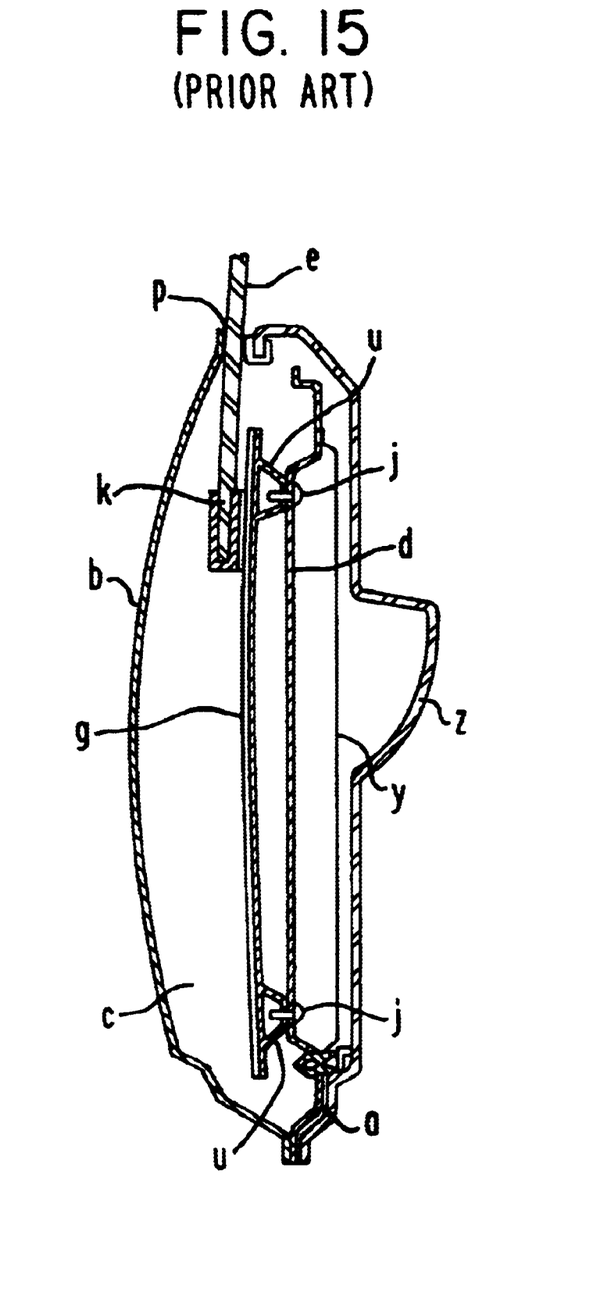
FIG. 15 is a sectional view of a conventional automotive door construction.

As shown in FIG. 15, the guide rail g is configured so that the upper and lower ends of the guide rail g are installed to the inner panel a so as to float via rail brackets u, and the glass mounting portion k can slide in the guide rail g while following a curved elevation path of the door glass e.

In the figures, reference character y denotes a sealing screen, and z denotes a door trim.

The automotive door construction configured as described above has a problem in that the openings d formed in the inner panel a cannot be made so large because large openings decrease the stiffness of the inner panel a or the door body.

Thereupon, when the glass elevating mechanism f is installed on the inside of the inner panel a, the worker causes to coincide the mount holes h and i with each other to install the screw j by one hand while inserting the other hand through the opening d to hold the glass elevating mechanism f, and in this state, he/she installs the glass elevating mechanism f on the inside of the inner panel a by using a motor tool. The insertion of the screw j into the mount hole h and the like work are blind work, and also the glass elevation mechanism f with a heavy weight must be held by one hand. Such very difficult work makes the worker become fatigued at an early stage. Also, since the guide rail g and the motor n are connected to each other by the wire m, the handling of the glass elevating mechanism f in the door bag portion c is very inconvenient. Thus, the installation work must be performed under bad conditions.

Further, since the inner panel a is formed with small openings d in consideration of the stiffness thereof, the weight of the inner panel a is heavy, which hinders the provision of a light-weight automotive door construction, and also the assembly workability is degraded because the work for installing the door glass e to the guide rail g is performed so that the worker inserts the door glass e through the upper opening p in the door bag portion c by holding the door glass e by one hand, and he/she holds the lower end of the door glass e by the other hand and installs the door glass e using a screw j etc. by inserting a screwdriver through a through hole s in a state in which the opening r in the glass mounting portion k is made to coincide with the mount hole q formed at the lower end of the door glass e, which is inevitably blind work.

The present invention has been made in view of the above situation, and accordingly an object thereof is to provide an automotive door construction in which a glass elevating mechanism can be incorporated easily without the formation of large holes in an inner panel.

SUMMARY OF THE INVENTION

To achieve the above object, the present invention provides an automotive door construction in which a mount hole for incorporating a glass elevating mechanism for raising/lowering a door glass is formed in an inner panel of a door body in which a door bag portion is formed between the inner panel and an outer panel, and a door trim is provided on the surface on the cabin side of the inner panel, wherein the door trim is divided into an upper trim and a lower trim; the glass elevating mechanism is installed on the inside surface of the lower trim so that the upper end of a guide rail projects upward from the upper edge of the lower trim; and the glass elevating mechanism is inserted from the upper end of the guide rail of the glass elevating mechanism through the mount hole in the inner panel, and is housed in the door bag portion, and then the lower trim is lowered along the inner panel, by which the glass elevating mechanism and lower trim are installed to the inner panel.

By this configuration, by forming the relatively small mount hole, which is shorter than the total length of the guide rail, in the inner panel, the modularized glass elevating mechanism can be incorporated in the door bag portion. Therefore, the stiffness of the inner panel or the door body is not decreased by the opening, and thus the inner panel need not be reinforced by a reinforcing member, so that there is no fear of the product becoming expensive and increased weight of door body. Also, since the lower trim is lowered after the glass elevating mechanism is incorporated, and the glass elevating mechanism and the lower trim are installed to the inner panel, by which the installation is completed, the installation work can be performed efficiently in a short period of time, and thus the workability can be improved significantly. Further, since the guide rail serves as a reinforcing member for reinforcing the mount hole formed in the inner panel, the stiffness of the inner panel is improved.

To achieve the above object, in the automotive door construction in accordance with the present invention, a holding member and a holding pin are provided between the inside surface on both sides of the lower trim and the inner panel so as to be engaged with each other when the lower trim is lowered.

By this configuration, when the lower trim is lowered along the inner panel, the holding member is engaged with the holding pin to position and fix the lower trim with respect to the inner panel. Therefore, the lower trim can be installed easily with high accuracy.

To achieve the above object, in the automotive door construction in accordance with the present invention, locking means is provided on the inside surface at the lower part of the lower trim so as to be engaged with the opening edge of the mount hole when the lower trim is lowered.

By this configuration, when the lower trim is lowered along the inner panel, the locking means provided on the inside surface at the lower part of the door trim is engaged with the opening edge of the mount hole, so that the lower part of the lower trim is fixed to the inner panel. Therefore, the lower trim can be installed easily.

To achieve the above object, in the automotive door construction in accordance with the present invention, a fixing element is projectingly provided at the upper part of the guide rail, and a key hole shaped locking hole, which allows the lower trim to lower in a state in which the fixing element is engaged, is formed on the inner panel side.

By this configuration, the fixing element threadedly installed at the upper part of the guide rail is engaged with the locking hole in the inner panel, by which the glass elevating mechanism is positioned with respect to the inner panel. Therefore, the glass elevating mechanism can be installed easily with high accuracy. Also, by properly tightening the fixing element after the lower trim is lowered along the inner panel, the guide rail can be fixed surely to the inner panel.

To achieve the above object, in the automotive door construction in accordance with the present invention, an upper bracket for fixing the upper edge portion of the lower trim via a grommet is projectingly provided at the upper part of the guide rail, and a lower bracket for locking the lower side of the lower trim is provided at the lower part of the guide rail.

By this configuration, the upper edge portion of the lower trim is fixed to the upper bracket via the grommet, by which the glass elevating mechanism can be installed to the lower trim. Therefore, the glass elevating mechanism can be temporarily fixed with ease in a short period of time.

DETAILED DESCRIPTION OF THE PREFERRED EMBODIMENTS

An embodiment of the present invention will be described in detail with reference to the accompanying drawings.

Figure 1:
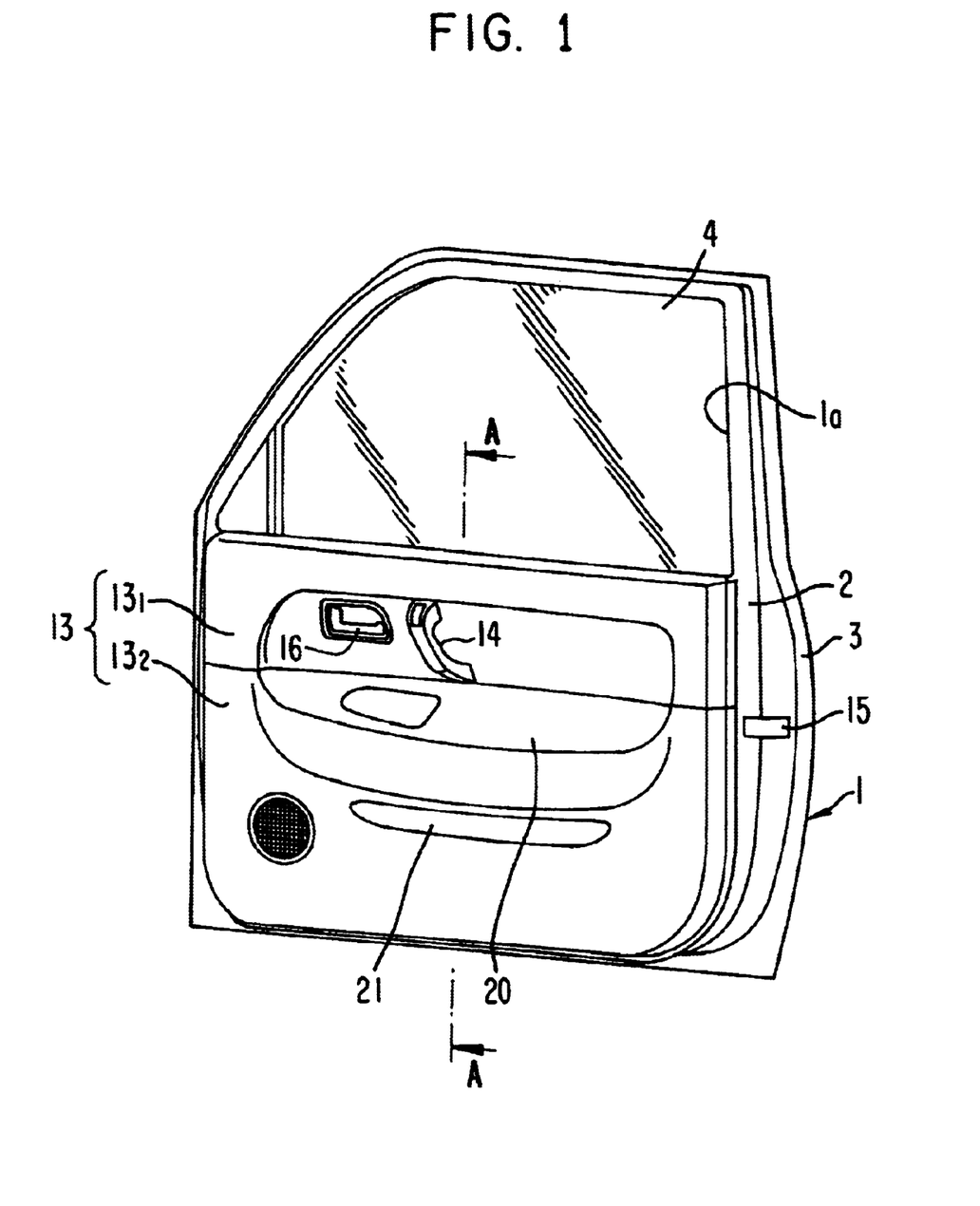
FIG. 1 is a perspective view of an automotive door construction in accordance with one embodiment of the present invention.
Figure 2:
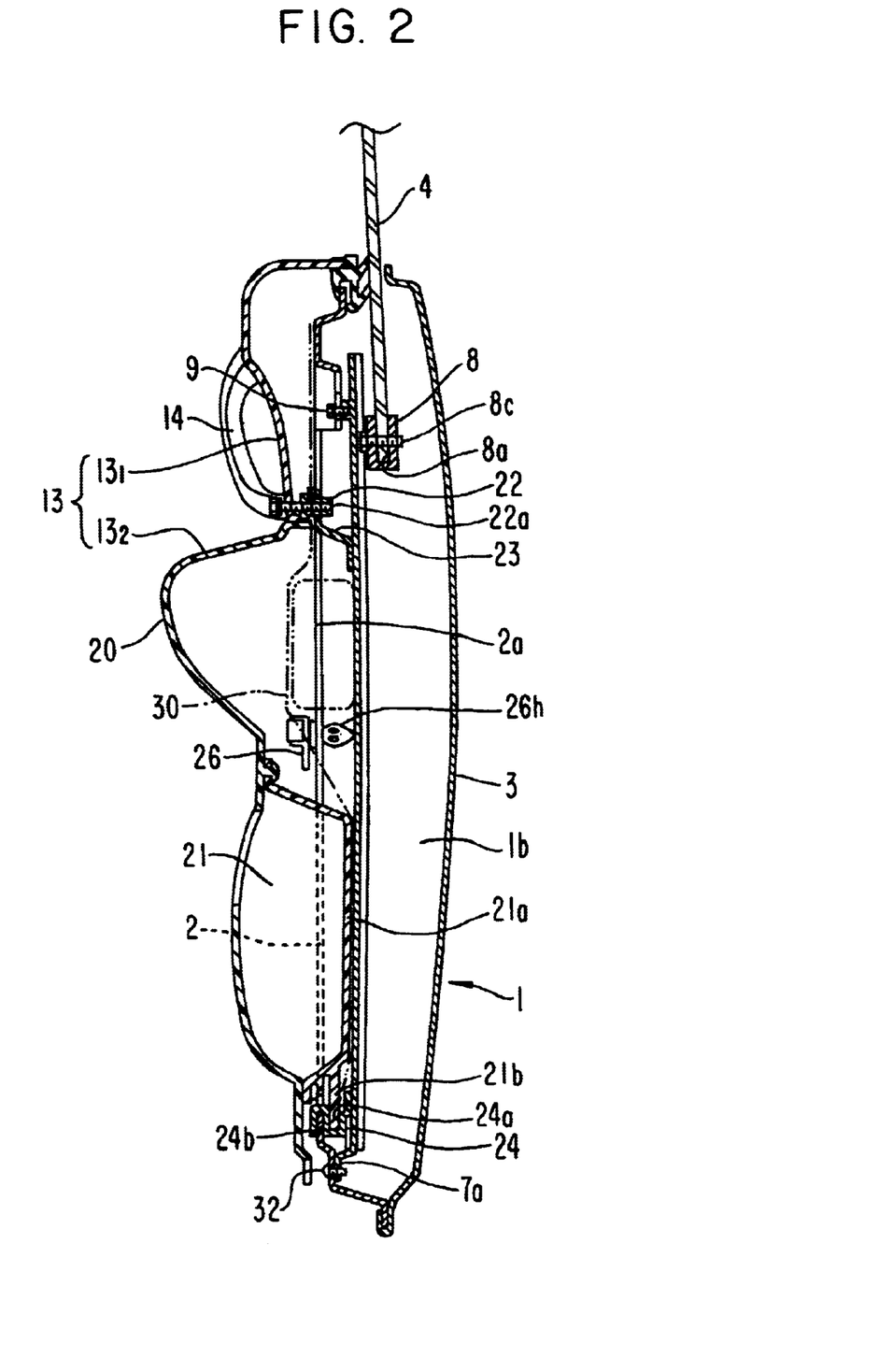
FIG. 2 is a sectional view taken along the line A—A of FIG. 1.
Figure 3:
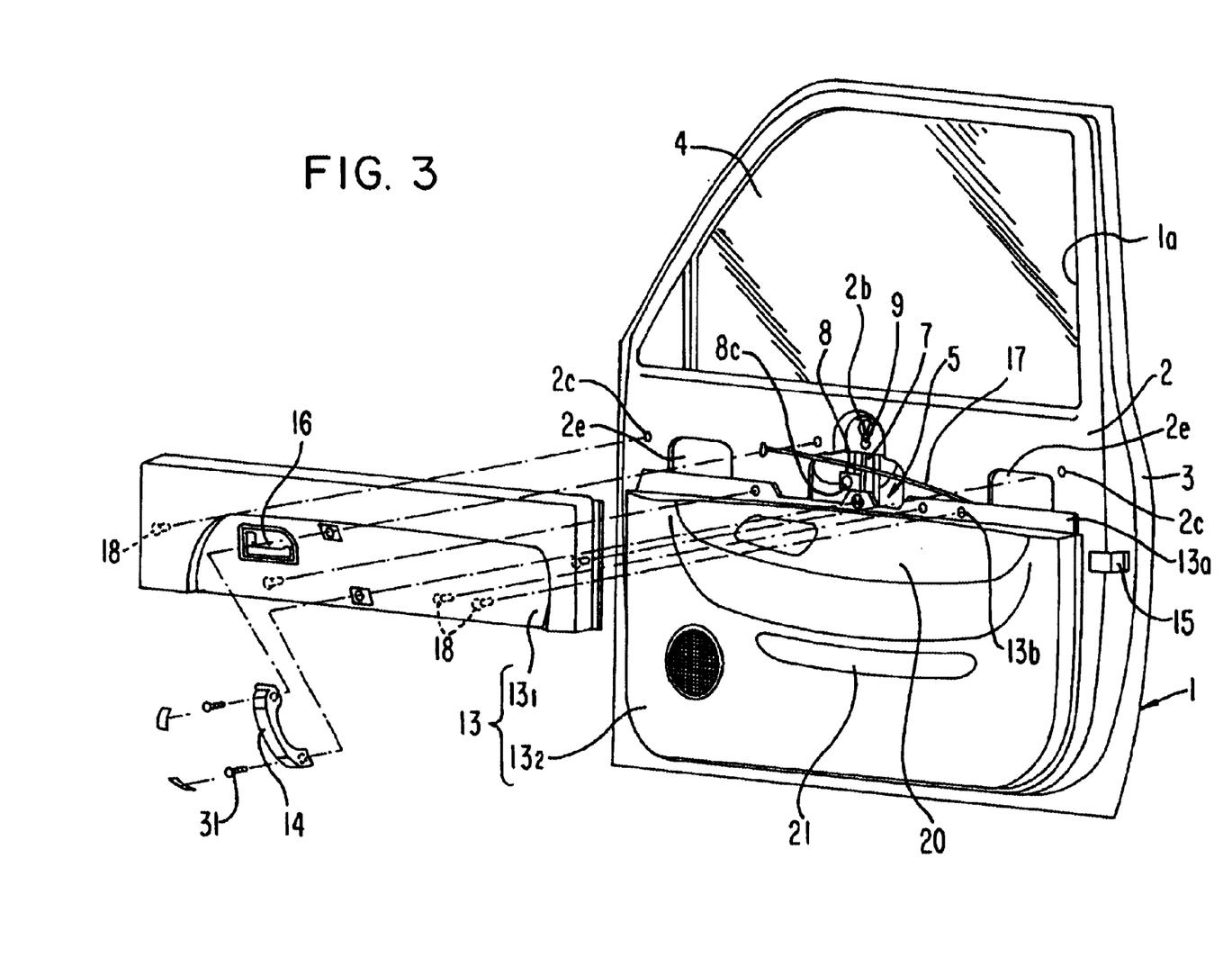
FIG. 3 is a perspective view of an automotive door construction in accordance with one embodiment of the present invention, showing a state in which an upper trim is removed.
Figure 4:
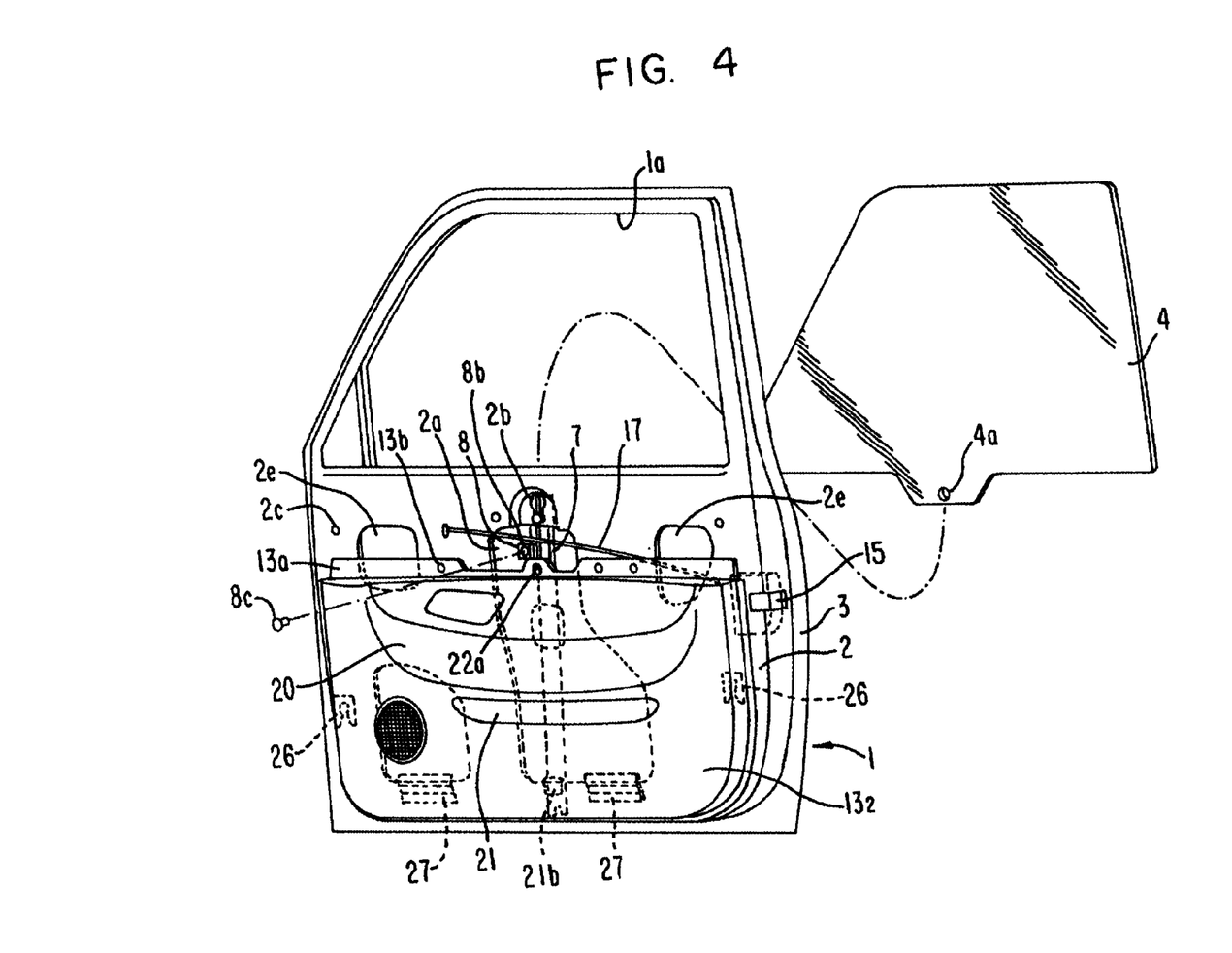
FIG. 4 is a perspective view of an automotive door construction in accordance with one embodiment of the present invention, showing a state in which a door glass is removed.
Figure 5:
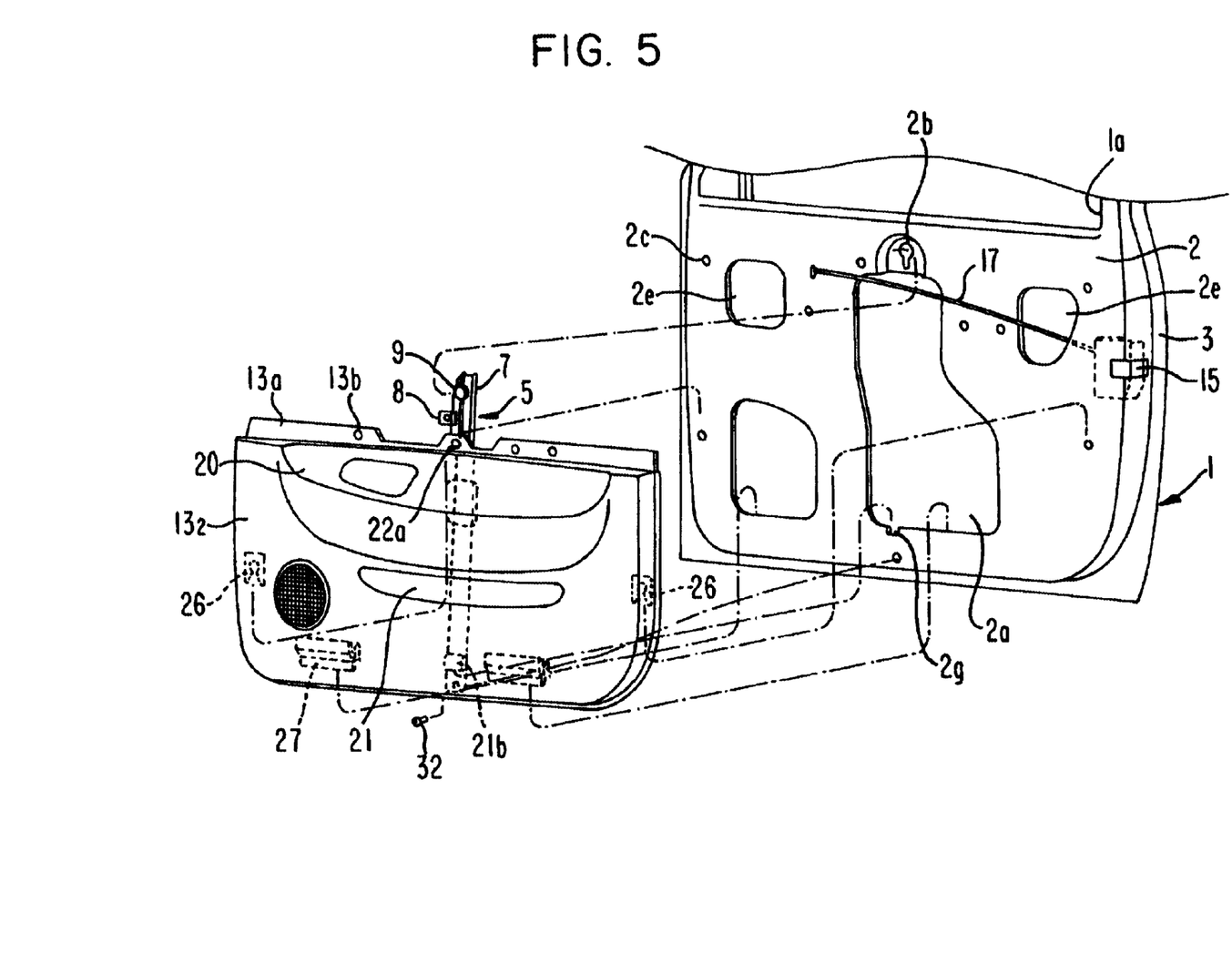
FIG. 5 is a perspective view of an automotive door construction in accordance with one embodiment of the present invention, showing a state in which a lower trim is removed.
Figure 6:
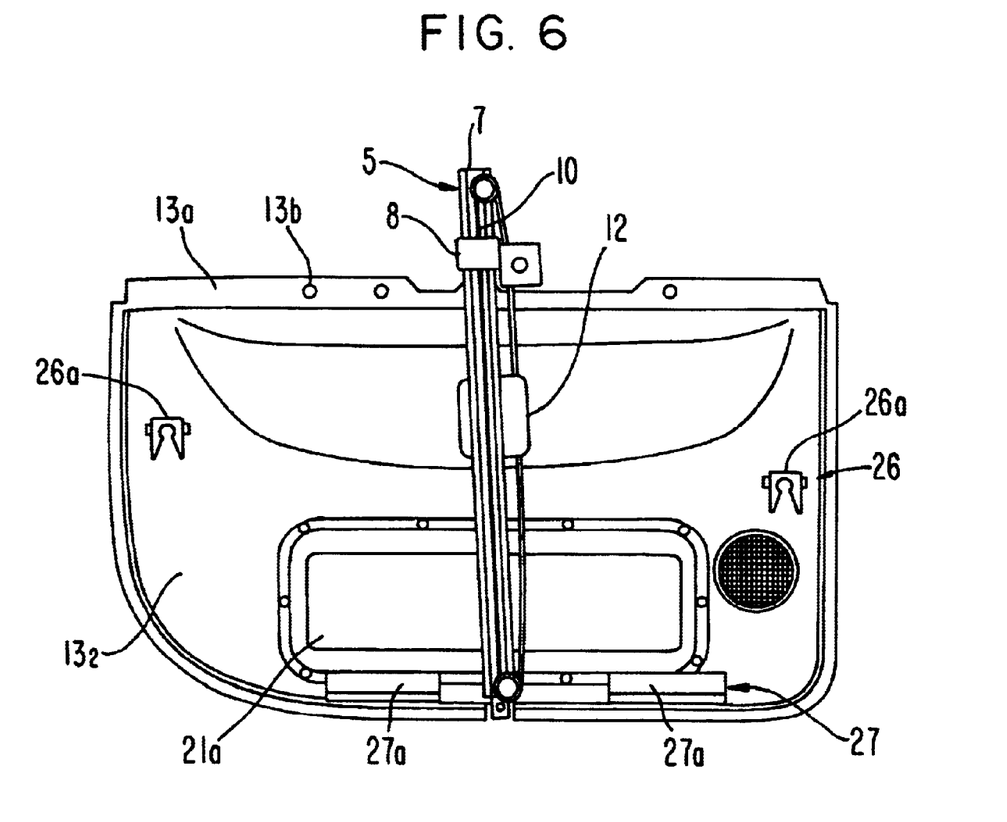
FIG. 6 is a back view of a lower trim used for an automotive door construction in accordance with one embodiment of the present invention.

FIG. 1 is a perspective view showing the inside surface of a door body, and FIG. 2 is a sectional view taken along the line A—A of FIG. 1.

A door body 1 has a double construction consisting of an inner panel 2 and an outer panel 3. By joining the peripheral portions of these two panels 2 and 3 to each other by welding or other means, the door body 1 having an integrated construction is constructed.

An opening 1a is formed at the upper part of the door body 1, and a door glass 4 is engaged with the opening 1a so that the door glass 4 can be raised or lowered by a glass elevating mechanism 5.

As shown in FIG. 2, the inner panel 2 is formed with a mount hole 2a, which is slender in the vertical direction, for incorporating the glass elevating mechanism 5 in a door bag portion 1b formed between the inner panel 2 and the outer panel 3. Above the mount hole 2a, a key hole shaped locking hole 2b for locking a fixing means 9 consisting of a bolt threadedly installed at the upper part of a guide rail constituting the glass elevating mechanism 5. Also, on both sides of the mount hole 2a, work holes 2e are formed.

The glass elevating mechanism 5 is provided with, for example, one vertical guide rail 7, and a glass holder 8 is supported in the guide rail 7 so as to be slidable vertically.

The glass holder 8 is formed substantially into a U shape in cross section so that the lower end portion of the door glass 4 can be inserted from the upside into a concave groove 8a formed in the top face of the glass holder 8. A fixing element 8c is threadedly inserted in mount holes 8b and 4a formed in the glass holder 8 and the door glass 4, respectively, by which the lower end of the door glass 4 is fixed to the glass holder 8.

The glass holder 8 is connected to a wire 10 that slides vertically in the guide rail 7. The wire 10 is driven by a glass elevating motor 12, by which the door glass 4 can be moved vertically via the glass holder 8. Also, at the lower part of the guide rail 7, a mounting portion 7a for fixing the guide rail 7 to the inner panel 2 is formed by being bent.

On the other hand, the inner panel 2 of the door body 1 is fitted with a door trim 13 so that the door trim 13 covers almost the whole surface of the inner panel 2.

The door trim 13 is divided into two parts; an upper trim $13_1$ for covering the upper part of the inner panel 2 and a lower trim $13_2$ for covering the intermediate part and the lower part of the inner panel 2. Each of the upper and lower panels $13_1$ and $13_2$ is molded integrally by using a synthetic resin.

The upper trim $13_1$ is provided with a grip 14 used when the door body 1 is opened or closed and an inner handle 16 for locking or unlocking a door lock 15. The inner handle 16 and the door lock 15 are connected to each other by a connecting rod 17. The upper trim $13_1$ is fixed to the inner panel 2 by pressing in a plurality of clips 18, which are installed on the inside surface of the upper trim $13_1$ in advance, in mount holes 2c formed in the inner panel 2 and mount holes 13b formed in an upper edge portion 13a of the lower trim $13_2$. The lower trim $13_2$ has an arm rest 20 integrally molded at the upper part thereof and a pocket 21 integrally molded at the lower part thereof.

In the upper edge portion 13a of the lower trim $13_2$, a mount hole 13c is formed in a substantially central portion thereof. A fixing element 22a such as a screw bolt inserted through the mount hole 13c is threadedly inserted in a grommet 22 fitted in a mount hole 23a in an upper bracket 23 projectingly provided at the upper part of the guide rail 7, by which the upper edge portion 13a of the lower trim $13_2$ located in the portion of the mount hole 2a in the inner panel 2 can be fixed to the guide rail 7.

Figure 8:
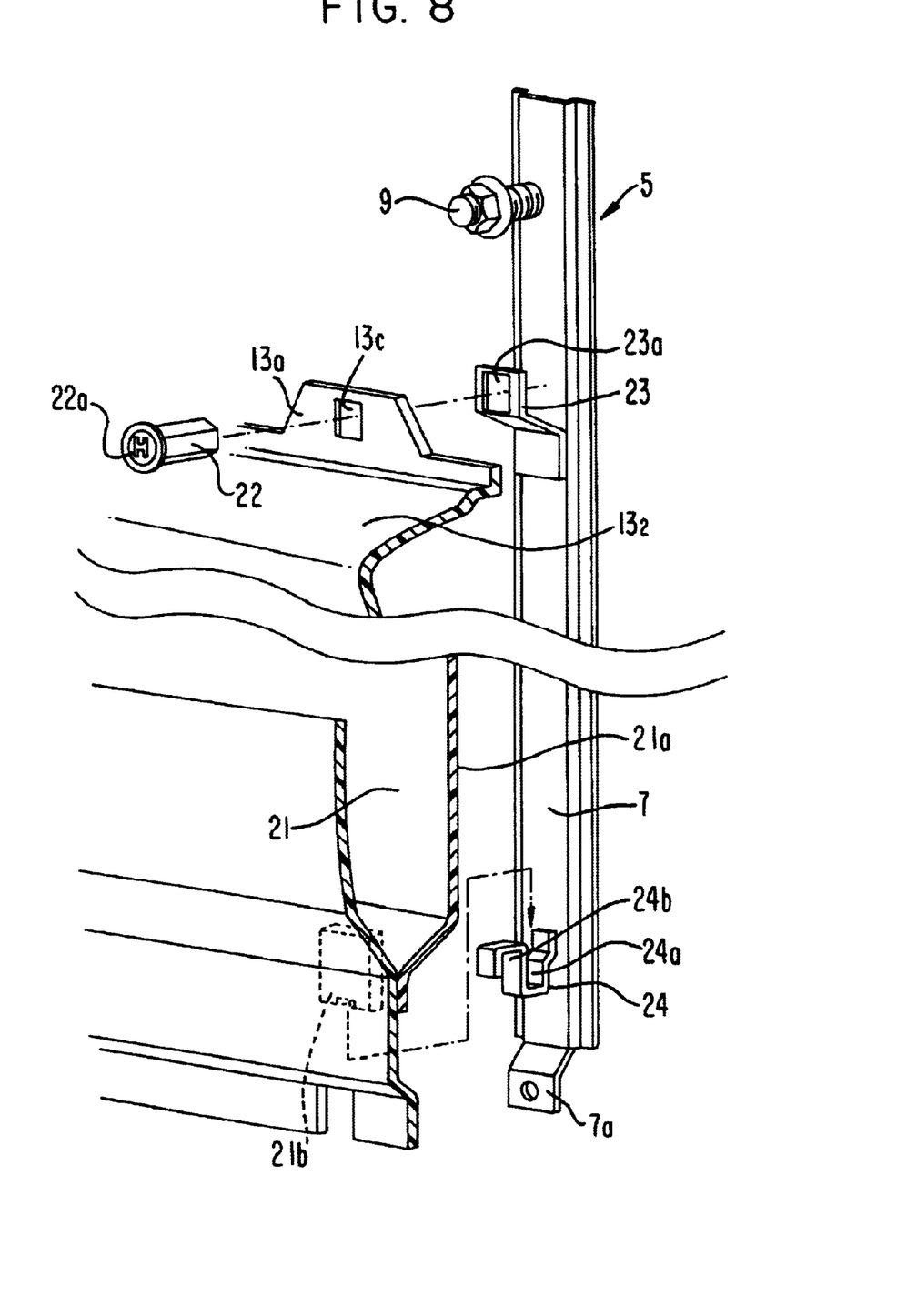
FIG. 8 is a perspective view of a lower trim of an automotive door construction in accordance with one embodiment of the present invention, showing a state in which the lower trim is being installed.

As shown in FIG. 8, at the lower part of the guide rail 7, there is fixed a lower bracket 24 formed substantially into a crank shape.

The lower bracket 24 is formed with an upward-directed concave groove 24a and a downward-directed concave groove 24b. As shown in FIG. 2, the upward-directed concave groove 24a is fitted from the downside on a mounting element 21b vertically provided at the lower part of a pocket inside wall 21a provided on the inside of the pocket 21, and the downward-directed concave groove 24b is fitted from the upside in a notch 2g formed at the lower edge of the mount hole 2a formed in the inner panel 2.

On the other hand, on the surface of the lower trim $13_2$ opposed to the inner panel 2, fixing means 26 and 27 are provided to fix the both side portions and the lower portions of the lower trim $13_2$ to the inner panel 2.

Figure 9:
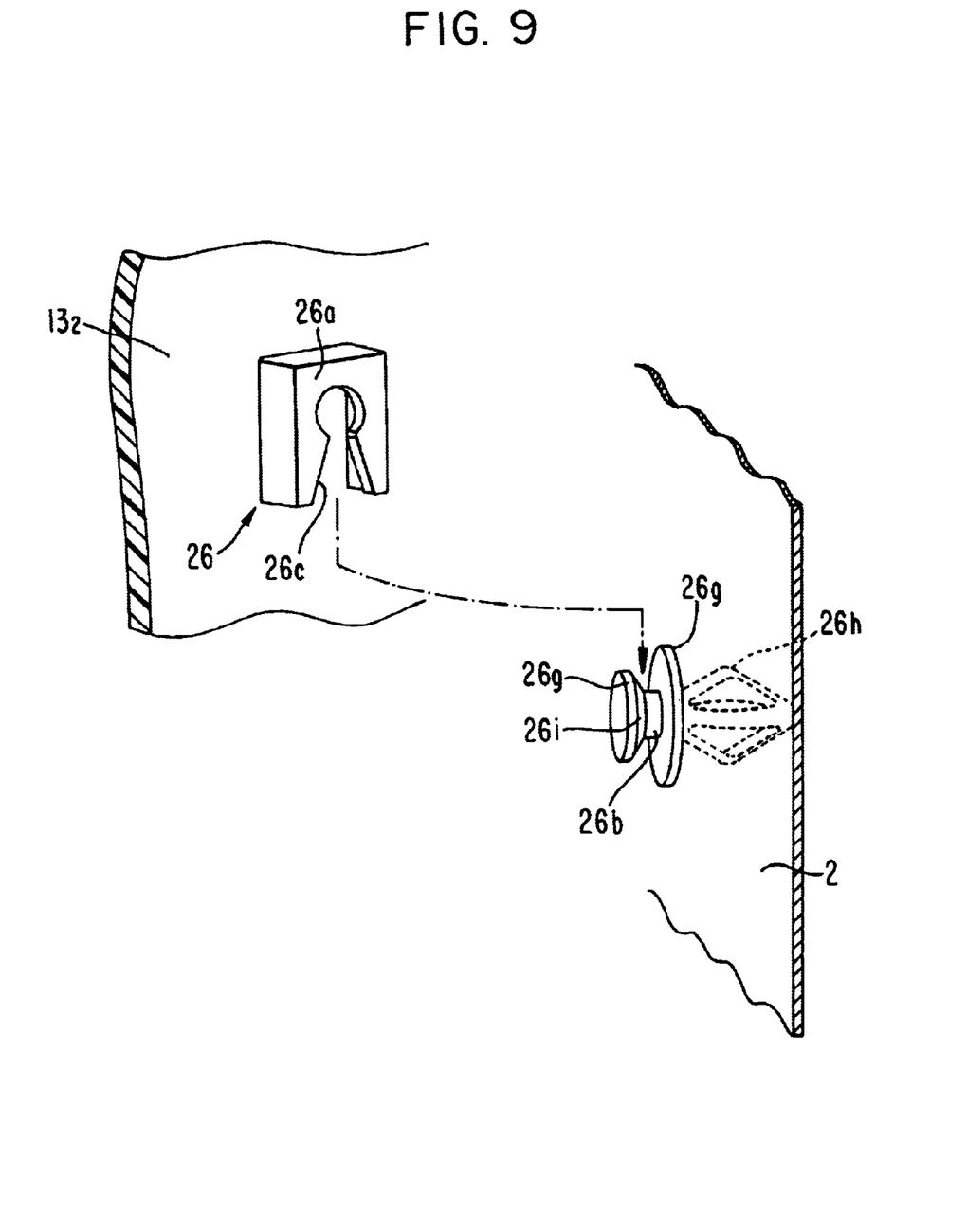
FIG. 9 is a perspective view showing a state in which a lower trim of a lower trim of an automotive door construction in accordance with one embodiment of the present invention is being installed.
Figure 10:
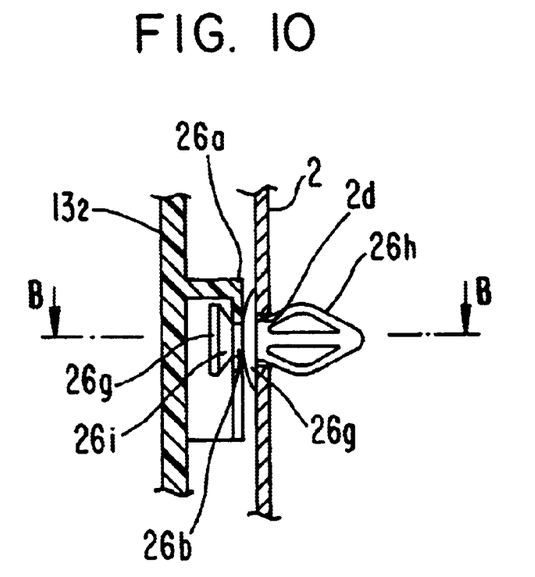
FIG. 10 is a sectional view of fixing means used for an automotive door construction in accordance with one embodiment of the present invention.
Figure 11:
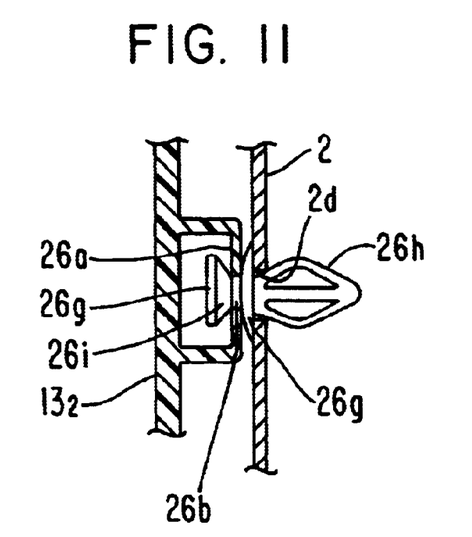
FIG. 11 is a sectional view taken along the line B—B of FIG. 10.

As shown in FIG. 9, the fixing means 26 for fixing both sides of the lower trim $13_2$ includes a substantially inverse U shaped holding member 26a installed on the inside surface of the lower trim $13_2$ and a holding pin 26b having a flanged pin projectingly provided on the inner panel 2 so as to be directed toward the lower trim $13_2$.

The holding member 26a is projectingly provided on the inside surface of the lower trim $13_2$ in such a manner that a notch 26c formed into a tapered shape is directed downward.

The holding pin 26b has a pair of flanges 26g, which hold the holding member 26a therebetween from both sides, and a clip portion 26h. One flange 26g is formed with a tapered portion 26i. The clip portion 26h is pressed in a mount hole 2d in the inner panel 2, by which the holding pin 26b is installed to the inner panel 2.

Figure 12:
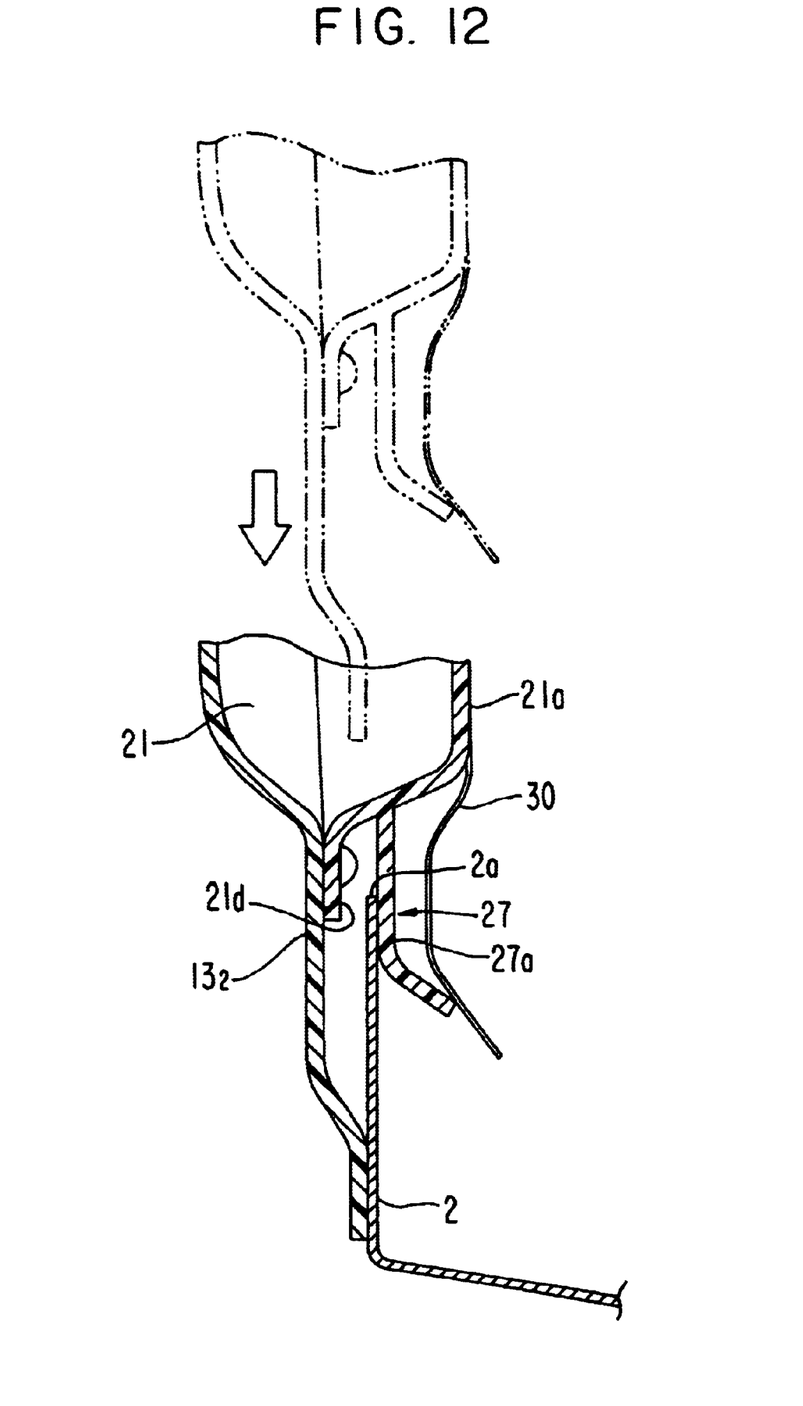
FIG. 12 is a sectional view showing a state in which a lower trim of a lower trim of an automotive door construction in accordance with one embodiment of the present invention is being installed.

As shown in FIG. 12, the paired fixing mean 27, which are locking means for fixing the lower part of the lower trim $13_2$ to the inner panel 2, have a mounting element 27a projectingly provided at the lower part of the pocket inside wall 21a so as to be directed downward. The lower opening edge of the mount hole 2a formed in the inner panel 2 is held between the mounting element 27a and a lower edge portion 21d of the pocket inside wall 21a (or the lower trim $13_2$), by which two locations at the lower part of the lower trim $13_2$ are fixed to the inner panel 2.

In FIG. 2, reference numeral 30 denotes a sealing screen for preventing rain water etc. from entering into a cabin.

The following is a description of the operation of the automotive door construction configured as described above. In incorporating the glass elevating mechanism 5 in the door bag portion 1b of the door body 1, the glass elevating mechanism 5 is first installed to the inside of the lower trim $13_2$ in a state in which the door glass 4 is not installed.

In order to install the glass elevating mechanism 5, as shown in FIG. 8, the upward-directed concave groove 24a of the lower bracket 24 fixed to the lower part of the guide rail 7 is fitted on the mounting element 21b vertically provided at the lower part on the inside of the pocket inside wall 21a, and then the guide rail 7 is temporarily fixed to the inside surface of the lower trim $13_2$ by the mounting hole 13c formed in the upper edge portion of the lower trim $13_2$ and the grommet 22 inserted in the mount hole 23a in the upper bracket 23 projectingly provided at the upper part of the guide rail 7.

Figure 7:
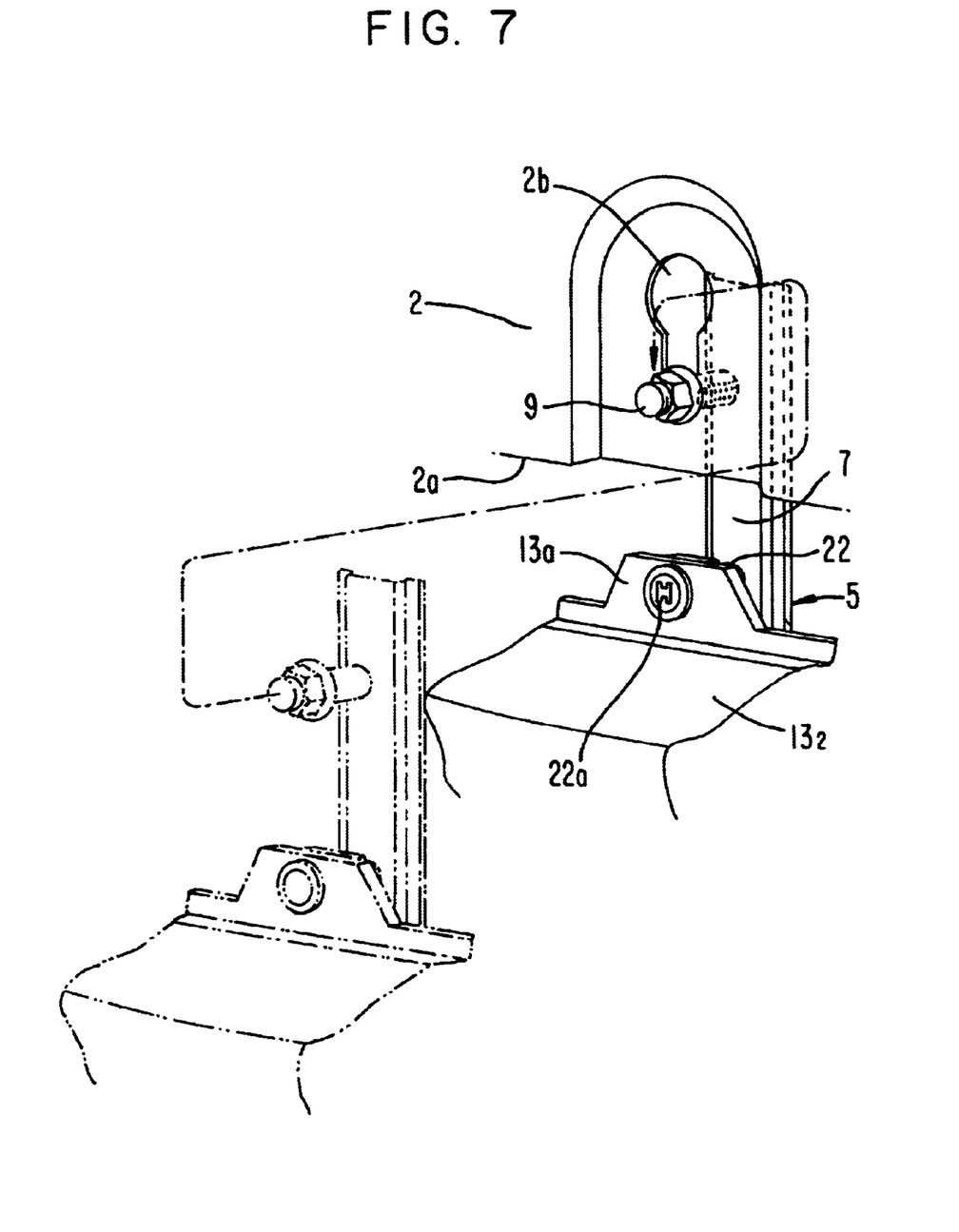
FIG. 7 is a perspective view of a glass elevating mechanism of an automotive door construction in accordance with one embodiment of the present invention, showing a state in which the glass elevating mechanism is being incorporated.

Next, the upper end of the guide rail 7 installed to the lower trim $13_2$ is inserted in the door bag portion 1b through the mount hole 2a in the inner panel 2, and as shown in FIG. 7, the fixing means 9 threadedly installed at the upper part of the guide rail 7 is inserted from the inside into the key hole shaped locking hole 2b formed in the inner panel 2.

From this state, the lower trim $13_2$ is slid along the inner panel 2. Thus, as shown in FIG. 9, the notch 26c of the holding member 26a installed in advance on the inside surface of the lower trim $13_2$ is fitted on the holding pin 26b installed in advance on the inner panel 2 while the position is regulated from the upside. At the same time, as shown in FIG. 12, the lower edge of the mount hole 2a formed in the inner panel 2 advances relatively between the mounting element 27a vertically provided at the lower part of the pocket inside wall 21a and the lower edge portion 21d of the pocket inside wall 21a.

Further, the lower trim $13_2$ is slid downward in this state. Thus, the fixing means 9 threadedly installed at the upper part of the guide rail 7 reaches the lower part of the locking hole 2b so that the guide rail 7 is temporarily fixed to the inner panel 2. Also, a holding hole 26d in the holding member 26a installed on the inside surface of the lower trim $13_2$ is fitted on the holding pin 26b, by which both sides of the lower trim $13_2$ are fixed by the holding pins 26b. Also, the inner panel 2 is held between the mounting element 27a vertically provided at the lower part of the pocket inside wall 21a and the lower edge portion 21d of the pocket inside wall 21a, by which the lower end of the lower trim $13_2$ is fixed to the inner panel 2.

After the lower trim $13_2$ is installed to the inner panel 2 in the above-described manner, the fixing means 9 threadedly installed at the upper part of the guide rail 7 is tightened properly. Thereby, the upper part of the guide rail 7 is fixed to the inner panel 2, and also the mounting portion 7a formed at the lower end of the guide rail 7 is fixed to the inner panel 2 by using a fixing element 32 such as a screw.

Next, in this state, the lower part of the door glass 4 is inserted from the upside into the door bag portion 1b through the opening 1a at the upper part of the door body 1. The lower part of the door glass 4 is fitted in the concave groove 8a in the glass holder 8 supported on the guide rail 7, and the lower part of the door glass 4 is fixed to the glass holder 8 by using the fixing element 8c. Such work can be performed by inserting a hand or a tool through the mount hole 2a and the work holes 2e formed in the inner panel 2. Therefore, the door glass 4 can be installed easily in a short period of time without the need for blind work.

After the door glass 4 has been installed in the above-described manner, the end of the connecting rod 17 is connected to the inner handle 16, which is installed in advance to the upper trim $13_1$. Then, the clips 18, which are installed on the inside surface of the upper trim $13_1$ in advance, are pressed in the mount holes 2c formed in the inner panel 2 and the mount holes 13b formed in the upper edge portion of the lower trim $13_2$, by which the upper trim $13_1$ is installed to the upper part of the inner panel 2.

Finally, the grip 14 is fixed on the inner panel 2 from the cabin side of the upper trim $13_1$ by using a fixing element 31, and the door glass 4 is installed to the door body 1, by which the installation of the glass elevating mechanism 5 and the door trim 13 is completed. Merely by forming the relatively small mount hole 2a, which is long vertically, in the inner panel 2, the glass elevating mechanism 5 can be installed in the door bag portion 1b. Therefore, there is no fear of the stiffness of the inner panel 2 or the door body 1 itself being decreased by the opening.

Figure 13:
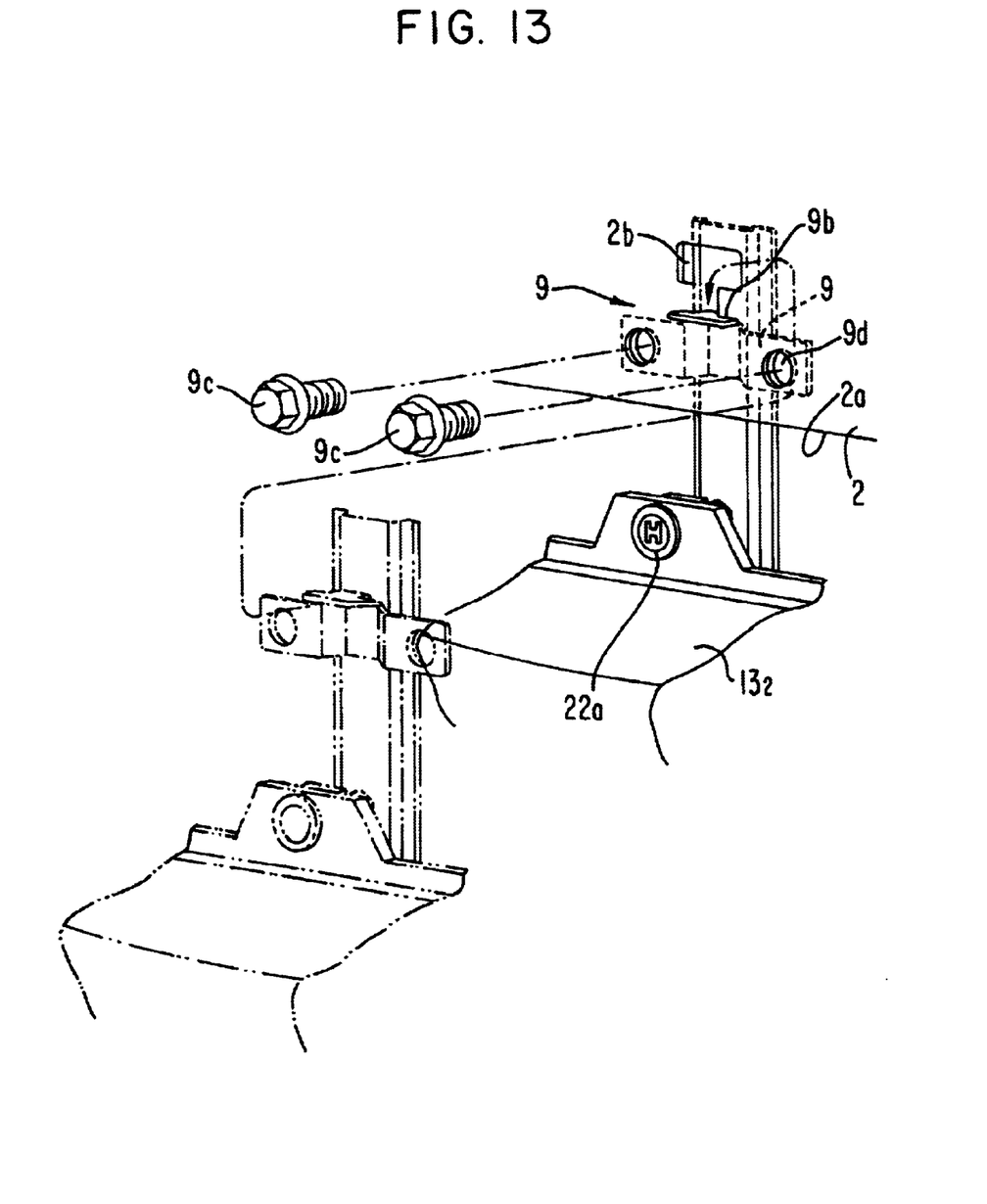
FIG. 13 is a perspective view showing a modification of fixing means for fixing the upper part of a guide rail to an inner panel.

In the above-described embodiment, apart from the mount hole 2a formed in the inner panel 2, the work holes 2e are formed. However, the mount hole 2a and the work holes 2e may be a continuous elongated hole, and also the fixing means 9 for fixing the upper part of the guide rail 7 to the inner panel 2 may be formed into a hook shape as shown in FIG. 13.

Specifically, a substantially T shaped hook 9b is provided in the center at the upper part of a fixing element 9a formed of a metal plate so as to project forward, and the hook 9b is hooked in the locking hole 2b formed in the inner panel 2, by which the upper part of the guide rail 7 is temporarily fixed to the inner panel 2. When the guide rail 7 is fixed to the inner panel 2, it is necessary only that the upper part of the guide rail 7 be fixed to the inner panel 2 by threadedly inserting fixing elements 9c such as bolts in threaded holes 9d in the fixing element 9a.

Also, in the above-described embodiment, the holding member 26a is provided on the lower trim side and the holding pin 26b is provided on the inner panel side. However, it is a matter of course that the holding pin 26b may be provided on the lower trim side and the holding member 26a may be provided on the inner panel side.

Further, although the glass elevating mechanism 5 consisting of one rail is used in the above-described embodiment, the mechanism consisting of two rails may be used.

As described above in detail, in the present invention, the door trim is divided into the upper trim and the lower trim, and the glass elevating mechanism is installed on the inside surface of the lower trim so that the upper end of the guide rail projects upward from the upper edge of the lower trim, by which the glass elevating mechanism and the door trim are modularized. Also, after the glass elevating mechanism is inserted through the mount hole in the inner panel from the upper end of the guide rail of the glass elevating mechanism, and is housed in the door bag portion, the lower trim is lowered along the inner panel, by which the glass elevating mechanism and the lower trim are installed to the inner panel. Therefore, by forming a relatively small mount hole, which is shorter than the total length of the guide rail, in the inner panel, the modularized glass elevating mechanism can be incorporated in the door bag portion. As a result, the stiffness of the inner panel or the door body is not decreased by the opening, and thus the inner panel need not be reinforced by a reinforcing member. Therefore, there is no fear of the product becoming expensive and increased weight of door body. Also, the door construction in which the glass elevating mechanism and the door trim are modularized can easily employed even for a small vehicle.

Also, after the glass elevating mechanism is temporarily fixed to the lower trim, the lower trim is slid downward to install the glass elevating mechanism and the lower trim to the inner panel, by which the installation of the glass elevating mechanism and the lower trim is completed. Therefore, the installation work can be performed efficiently in a short period of time, and thus the workability can be improved significantly. Also, since the guide rail, which is longer than the vertical length of the opening formed in the inner panel, can be incorporated in the door bag portion, the effective stroke of the glass holder can be increased, by which the area of the upper opening formed in the door body can be increased.

What is claimed is:

1. An automotive door construction in which a mount hole for incorporating a glass elevating mechanism for raising/lowering a door glass is formed in an inner panel of a door body in which a hollow interior cavity is formed between the inner panel and an outer panel, and a door trim is provided on a surface on a cabin side of said inner panel, wherein said door trim is divided into an upper trim and a lower trim; said glass elevating mechanism is installed on the inside surface of said lower trim so that an upper end of a guide rail projects upward from an upper edge of said lower trim; and said glass elevating mechanism is inserted from the upper end of the guide rail of said glass elevating mechanism through the mount hole in said inner panel, and is housed in said hollow interior cavity, and then said lower trim is allowed along said inner panel, by which said glass elevating mechanism and said lower trim are installed to said inner panel.

2. The automotive door construction according to claim 1, wherein a holding member and a holding pin are provided between the inside surface on both sides of said lower trim and said inner panel so as to be engaged with each other when said lower trim is lowered.

3. The automotive door construction according to claim 2, wherein locking means is provided on the inside surface at a lower part of said lower trim so as to be engaged with an opening edge of said mount hole when said lower trim is lowered.

4. The automotive door construction according to claim 2, wherein fixing means is projectingly provided an upper part of said guide rail, and a key hole shaped locking hole, which allows said lower trim to lower in a state in which said fixing means is engaged, is formed on the inner panel.

5. The automotive door construction according to claim 2, wherein an upper bracket for fixing the upper edge of said lower trim via a grommet is projectingly provided at an upper part of said guide rail, and a lower bracket for locking the lower side of said lower trim is provided at a lower part of said guide rail.

6. The automotive door construction according to claim 1, wherein locking means is provided on the inside surface at a lower part of said lower trim so as to be engaged with an opening edge of said mount hole when said lower trim is lowered.

7. The automotive door construction according to claim 6, wherein fixing means is projectingly provided at an upper part of said guide rail, and a key hole shaped locking hole, which allows said lower trim to lower in a state in which said fixing means is engaged, is formed on the inner panel.

8. The automotive door construction according to claim 6, wherein an upper bracket for fixing the upper edge of said lower trim via a grommet is projectingly provided at an upper part of said guide rail, and a lower bracket for locking the lower side of said lower trim is provided at a lower part of said guide rail.

9. The automotive door construction according to claim 1, wherein fixing means is projectingly provided at an upper part of said guide rail, and a key hole shaped locking hole, which allows said lower trim to lower in a state in which said fixing means is engaged, is formed on the inner panel.

10. The automotive door construction according to claim 9, wherein an upper bracket for fixing the upper edge of said lower trim via a grommet is projectingly provided at the upper part of said guide rail, and a lower bracket for locking the lower side of said lower trim is provided at a lower part of said guide rail.

11. The automotive door construction according to claim 1, wherein an upper bracket for fixing the upper edge of said lower trim via a grommet is projectingly provided at an upper part of said guide rail, and a lower bracket for locking a lower side of said lower trim is provided at a lower part of said guide rail.

* * * * *